US012707499B2

(12) United States Patent
Dwivedi et al.

(10) Patent No.: US 12,707,499 B2
(45) Date of Patent: Aug. 11, 2026

(54) CONFLICT MITIGATION FOR ENHANCED MULTI-LINK SINGLE-RADIO (EMLSR) LINKS BETWEEN MULTI-LINK DEVICES

(71) Applicant: QUALCOMM Incorporated, San Diego, CA (US)

(72) Inventors: Ashwani Dwivedi, Hyderabad (IN); Sandip Homchaudhuri, San Jose, CA (US); Alireza Raissinia, Monte Sereno, CA (US)

(73) Assignee: QUALCOMM Incorporated, San Diego, CA (US)

(*) Notice: Subject to any disclaimer, the term of this patent is extended or adjusted under 35 U.S.C. 154(b) by 376 days.

(21) Appl. No.: 18/473,024

(22) Filed: Sep. 22, 2023

(65) Prior Publication Data

US 2025/0106893 A1 Mar. 27, 2025

(51) Int. Cl.

*H04W 4/00* (2018.01)
*H04L 1/08* (2006.01)
*H04W 24/08* (2009.01)
*H04W 74/0816* (2024.01)

(52) U.S. Cl.

CPC ........... *H04W 74/0816* (2013.01); *H04L 1/08* (2013.01); *H04W 24/08* (2013.01)

(58) Field of Classification Search

USPC .................................................. 370/329, 330
See application file for complete search history.

(56) References Cited

U.S. PATENT DOCUMENTS

2023/0028091 A1* 1/2023 Cariou ................. H04B 7/0617
2023/0103061 A1* 3/2023 Shafin ............... H04W 52/0216 370/311
2023/0144291 A1 5/2023 Naik et al.
2023/0292225 A1* 9/2023 Ratnam ............. H04W 28/0263
2023/0362992 A1* 11/2023 Park .................. H04W 74/0808
2024/0407003 A1* 12/2024 Lu ...................... H04W 74/0816
2025/0193955 A1* 6/2025 Bai ....................... H04W 76/15
2025/0393069 A1* 12/2025 Viger .................. H04W 74/006
2026/0019206 A1* 1/2026 Dong .................... H04L 5/0048

FOREIGN PATENT DOCUMENTS

WO 2023163574 A1 8/2023

OTHER PUBLICATIONS

International Search Report and Written Opinion—PCT/US2024/044465—ISA/EPO—Dec. 9, 2024.

* cited by examiner

Primary Examiner — Chuong T Ho
(74) *Attorney, Agent, or Firm* — Avek IP, LLC

(57) ABSTRACT

This disclosure relates to multi-link communications in wireless communication networks. Some aspects more specifically relate to conflict mitigation techniques for enhanced multi-link single-radio (EMLSR) links between multi-link devices. In some examples, an access point (AP) multi-link device (MLD) and a non-AP MLD may communicate via two enhanced multi-link single-radio (EMLSR) links, one of which may be an anchor link of the non-AP MLD. In some examples, the non-AP MLD may maintain a beacon drop count representing a number of beacons that it has dropped on its anchor link since its last successful receipt of a beacon. In some examples, when the beacon drop count satisfies a beacon drop threshold, the non-AP MLD may transmit a packet on the non-anchor link to initiate a communication pause for the non-anchor link, so that it can receive a beacon on the anchor link.

18 Claims, 13 Drawing Sheets

530

600

CONFLICT MITIGATION FOR ENHANCED MULTI-LINK SINGLE-RADIO (EMLSR) LINKS BETWEEN MULTI-LINK DEVICES

TECHNICAL FIELD

This disclosure relates generally to wireless communication, and more specifically, to multi-link communications in wireless communication networks.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless STAs in a WLAN may be non-access point (non-AP) multi-link devices (MLDs) that support operation on multiple links but receive or transmit frames on only one link at a time. By operating in an enhanced multi-link single-radio (EMLSR) mode, such a non-AP MLD may be able to use multiple receive chains to concurrently monitor each of a set of multiple EMLSR links for control frame transmissions from an access point (AP) MLD. In order to do so, the non-AP MLD may apply a 1×1 spatial stream configuration, according to which it may be able to monitor each of the multiple EMLSR links using a respective one of its multiple receive chains. One of the multiple EMLSR links may be an anchor link for the non-AP MLD, which may need to receive beacons from the AP MLD via that anchor link. By operating in the 1×1 spatial stream configuration, the non-AP MLD may be able to use one receive chain to monitor its anchor link for beacon frames, while concurrently using another receive chain to monitor another EMLSR link for control frame transmissions. If the AP MLD transmits a control frame on the other EMLSR link to initiate a data communication exchange, the non-AP MLD may need to transition to a different spatial stream configuration—according to which it can no longer monitor its anchor link for beacon frames—in order to complete the data communication exchange.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless station. The wireless station includes a processing system that includes processor circuitry and memory circuitry that stores code, the processing system configured to cause the wireless station to update a beacon drop count for a first enhanced multi-link single-radio (EMLSR) link with an access point (AP) multi-link device (MLD) in association with there being a conflict between a beacon reception interval for the first EMLSR link and a data communication interval for a second EMLSR link with the AP MLD, and transmit a packet to the AP MLD in association with initiating a communication pause for the second EMLSR link in accordance with the updated beacon drop count satisfying a threshold.

In some examples, the packet may include a request-to-send (RTS) frame or a clear-to-send (CTS)-to-self frame. In some examples, the packet may include a frame including a network allocation vector (NAV) indicating a duration of the communication pause. In some examples, the packet may include a quality-of-service (QoS) null frame.

Another innovative aspect of the subject matter described in this disclosure may be implemented in a method for wireless communication by a wireless station. The method includes updating a beacon drop count for a first EMLSR link with an AP MLD in association with there being a conflict between a beacon reception interval for the first EMLSR link and a data communication interval for a second EMLSR link with the AP MLD, and transmitting a packet to the AP MLD in association with initiating a communication pause for the second EMLSR link in accordance with the updated beacon drop count satisfying a threshold.

In some examples, the packet may include an RTS frame or a CTS-to-self frame. In some examples, the packet may include a frame including an NAV indicating a duration of the communication pause. In some examples, the packet may include a QoS null frame.

Another innovative aspect of the subject matter described in this disclosure may be implemented in a wireless access point. The wireless access point includes a processing system that includes processor circuitry and memory circuitry that stores code, the processing system configured to cause the wireless access point to update a retransmission count for a first EMLSR link with a non-AP MLD in association with a retransmission of a multi-user RTS (MU-RTS) frame of a data communication exchange with the non-AP MLD over the first EMLSR link or a retransmission of a physical layer protocol data unit (PPDU) of the data communication exchange with the non-AP MLD over the first EMLSR link, and monitor, in accordance with a conflict mitigation procedure associated with the updated retransmission count satisfying a threshold, for conflicts between data communication intervals for the first EMLSR link and beacon reception intervals for a second EMLSR link with the non-AP MLD.

In some examples, the processing system may be configured to cause the AP MLD to delay an MU-RTS transmission associated with an existence, subsequent to initiation of the conflict mitigation procedure, of a conflict between a data communication interval for the first EMLSR link and a beacon reception interval for the second EMLSR link. In some examples, the processing system may be configured to cause the AP MLD to initiate the conflict mitigation procedure in accordance with the retransmission count satisfying the threshold value and the non-AP MLD being in an active mode on the first EMLSR link and on the second EMLSR link.

Another innovative aspect of the subject matter described in this disclosure may be implemented in a method for wireless communication by a wireless access point. The method includes updating a retransmission count for a first EMLSR link with a non-AP MLD in association with a retransmission of an MU-RTS frame of a data communication exchange with the non-AP MLD over the first EMLSR link or a retransmission of a PPDU of the data communication exchange with the non-AP MLD over the first EMLSR link, and monitoring, in accordance with a conflict mitigation procedure associated with the updated retransmission count satisfying a threshold, for conflicts between data communication intervals for the first EMLSR link and beacon reception intervals for a second EMLSR link with the non-AP MLD.

In some examples, the method may include delaying an MU-RTS transmission associated with an existence, subsequent to initiation of the conflict mitigation procedure, of a conflict between a data communication interval for the first EMLSR link and a beacon reception interval for the second EMLSR link. In some examples, the method may include initiating the conflict mitigation procedure in accordance with the retransmission count satisfying the threshold value and the non-AP MLD being in an active mode on the first EMLSR link and on the second EMLSR link.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
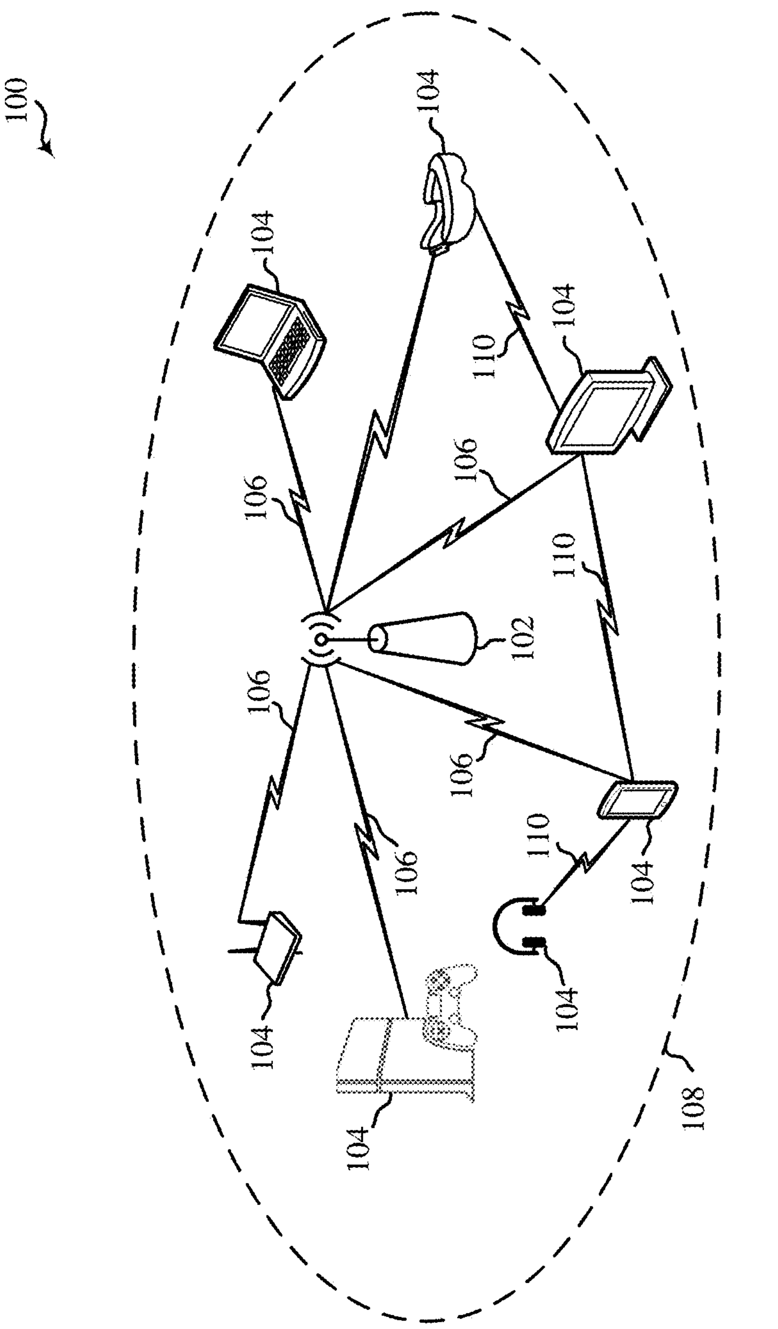
FIG. 1 shows a pictorial diagram of an example wireless communication network.

The following description is directed to some particular examples for the purposes of describing innovative aspects of this disclosure. However, a person having ordinary skill in the art will readily recognize that the teachings herein may be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication and more particularly to multi link communications in wireless communication networks. Some aspects more specifically relate to techniques for mitigating conflicts among respective communications on multiple wireless communication links between multi-link devices. In some examples, a non-access point (non-AP) multi-link device (MLD) may observe a beacon drop threshold representing a number of beacon transmissions on a first enhanced multi-link single-radio (EMLSR) link with an access point (AP) MLD that the non-AP MLD may drop in order to engage in data communications with the AP MLD on a second EMLSR link. In various examples, the first EMLSR link may be an anchor link of the non-AP MLD, and the second EMLSR link may be a non-anchor link. In some examples, the non-AP MLD may maintain a beacon drop count that represents a number of beacon transmissions that it has dropped on the first EMLSR link since a last successful receipt of a beacon on the first EMLSR link.

In various examples, when the non-AP MLD skips a beacon transmission on the first EMLSR link to receive data from the AP MLD via the second EMLSR link, the non-AP MLD may update the beacon drop count. In some examples, the non-AP MLD may then determine whether it may drop any additional beacons on the first EMLSR link based on the updated beacon drop count and the beacon drop threshold. In various examples, if the non-AP MLD determines that it may not drop any further beacon transmissions, it may initiate a communication pause for the second EMLSR link to postpone further data communications on that link by enough time to enable the non-AP MLD to receive a beacon on the first EMLSR link. In some examples, in conjunction with initiating the communication pause for the second EMLSR link, the non-AP MLD may reset the beacon drop count. In various examples, the non-AP MLD may initiate the communication pause by sending a packet to the AP MLD via the second EMLSR link. In some examples, the packet may include an RTS frame, a CTS to self frame, or a quality of service (QoS) null frame. In various examples, the packet may include a frame including a network allocation vector (NAV) indicating a duration of the communication pause.

Particular aspects of the subject matter described in this disclosure may be implemented to realize one or more of the following potential advantages. In some examples, by implementing communication pauses on its non-anchor link to enable receipt of beacons on its anchor link, the non-AP MLD can rehabilitate its anchor link when it becomes degraded. In some examples, implementing such communication pauses selectively—based on whether the beacon drop count satisfies the beacon drop threshold—may allow the non-AP MLD to drop beacon(s) and prioritize data communications on its non-anchor link while the condition of its anchor link is good. This may enable to non-AP MLD to achieve improved data reception rates while preserving link integrity. Additionally, by initiating communication pauses to cause the AP MLD to delay data transmissions, rather than simply dropping those data transmissions, the non-AP MLD can reduce the chances of data loss. Furthermore, the AP MLD may be less likely to erroneously conclude that the non-anchor link has been lost, and less likely to repeat data transmissions on the non-anchor link. As such, wireless resource consumption may be reduced both with respect to control transmission overhead and data transmission, and utilization of the non-anchor link may thus be more efficient.

FIG. 1 shows a pictorial diagram of an example wireless communication network 100. According to some aspects, the wireless communication network 100 may be an example of a wireless local area network (WLAN) such as a Wi-Fi network. For example, the wireless communication network 100 may be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 may be an example of a cellular radio access network (RAN), such as a 5G or 6G RAN that implements one or more cellular protocols such as those specified in one or more 3GPP standards. In some other examples, the wireless communication network 100 may include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 may include multiple APs 102. The AP 102 may be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons may include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz, 45 GHZ, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 may be covered by more than one AP 102 and may associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger network such as the wireless communication network 100. In such examples, while the STAs 104 may be capable of communicating with each other through the AP 102 using communication links 106, STAs 104 also may communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ, 5 GHZ, 6 GHZ, 45 GHZ, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHZ-7.125 GHZ), FR2 (24.25 GHZ-52.6 GHZ), FR3 (7.125 GHZ-24.25 GHZ), FR4a or FR4-1 (52.6 GHZ-71 GHZ), FR4 (52.6 GHZ-114.25 GHZ), and FR5 (114.25 GHZ-300 GHZ).

Each of the frequency bands may include multiple subbands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHZ, 5 GHZ, or 6 GHZ bands, each of which is divided into multiple 20 MHz channels. As such, these PPDUs are transmitted over a physical channel having a minimum bandwidth of 20 MHz, but larger channels may be formed through channel bonding. For example, PPDUs may be transmitted over physical channels having bandwidths of 40 MHZ, 80 MHZ, 160 MHZ, 240 MHZ, 320 MHz, 480 MHz, or 640 MHz by bonding together multiple 20 MHz channels.

Figure 2:
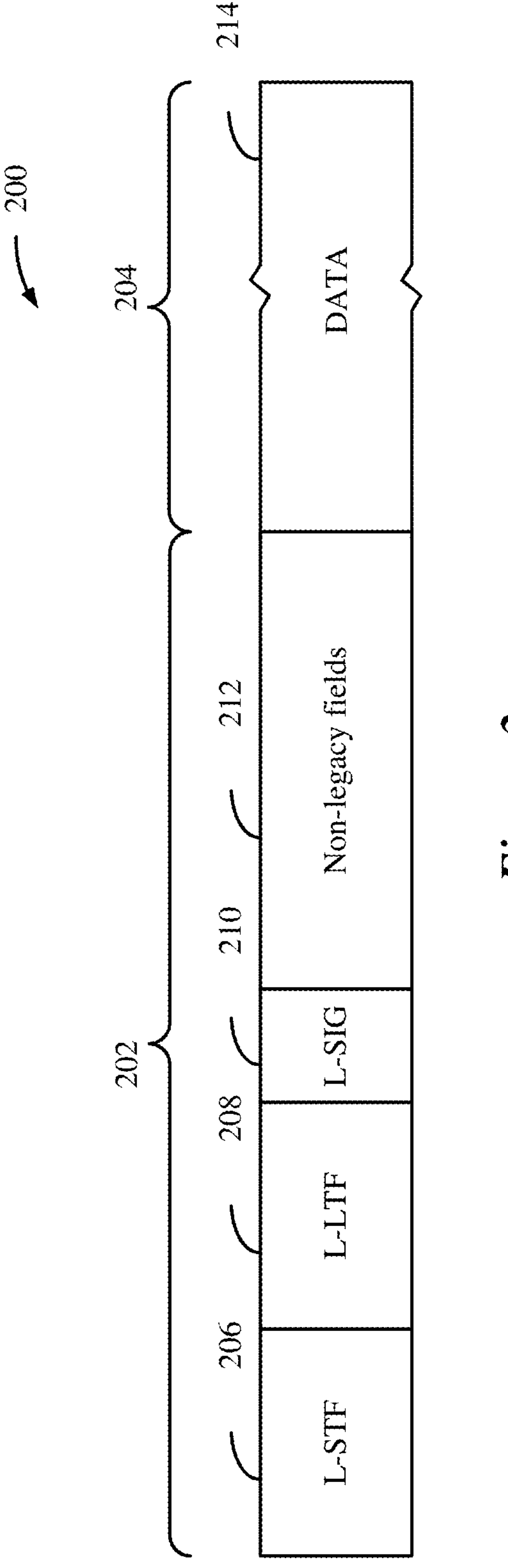
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 may be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as AP 102 or STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
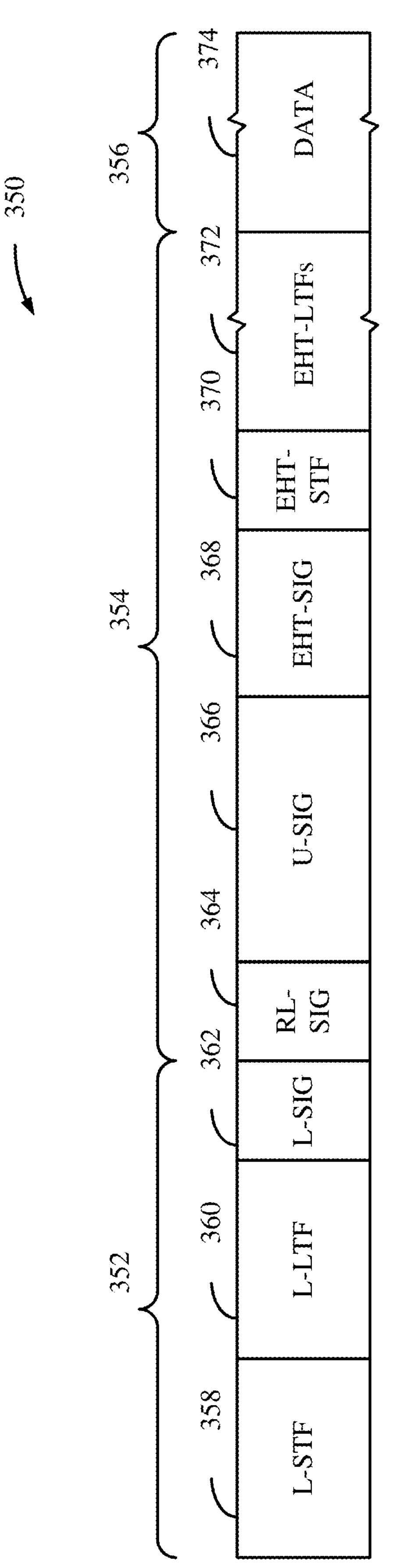
FIG. 3 shows an example physical layer (PHY) protocol data unit (PPDU) usable for communications between a wireless AP and one or more wireless STAs.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as the AP 102 or the STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field may indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
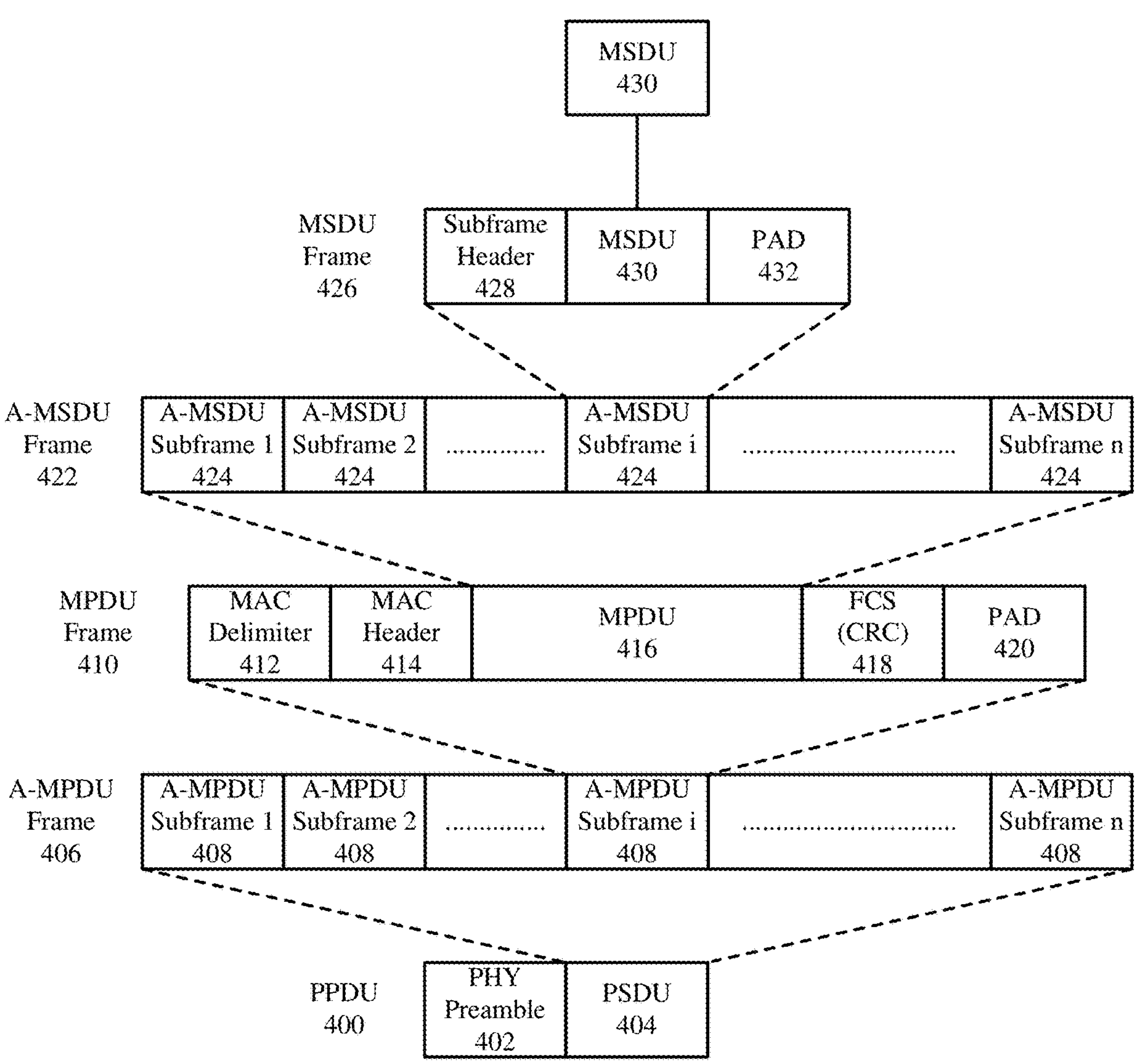
FIG. 4 shows a hierarchical format of an example PPDU usable for communications between a wireless AP and one or more wireless STAs.

FIG. 4 shows a hierarchical format of an example PPDU usable for communications between a wireless AP and one or more wireless STAs. For example, the AP and STAs may be examples of the AP 102 and the STAs 104 described with reference to FIG. 1. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device (such as the AP 102 or the STA 104) may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device may transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

In some other examples, the wireless communication device (for example, the AP 102 or the STA 104) may contend for access to the wireless medium of WLAN 100 in accordance with an enhanced distributed channel access (EDCA) procedure. A random channel access mechanism such as EDCA may afford high-priority traffic a greater likelihood of gaining medium access than low-priority traffic. The wireless communication device using EDCA may classify data into different access categories. Each AC may be associated with a different priority level and may be assigned a different range of random backoffs (RBOs) so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

Retransmission protocols, such as hybrid automatic repeat request (HARQ), also may offer performance gains. A HARQ protocol may support various HARQ signaling between transmitting and receiving wireless communication devices (for example, the AP 102 and the STAs 104 described with reference to FIG. 1) as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions may be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some wireless communication devices (including both APs and STAs such as, for example, AP 102 and STAs 104 described in FIG. 1) are capable of multi-link operation (MLO). In some examples, MLO supports establishing multiple different communication links (such as a first link on the 2.4 GHz band, a second link on the 5 GHz band, and the third link on the 6 GHz band) between the STA 104 and the AP 102 and exchanging packets on one or more communications links concurrently and dynamically. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). An MLD may include a single upper MAC layer, and may include, for example, three independent lower MAC layers and three associated independent PHY layers for respective links in the 2.4 GHZ, 5 GHZ, and 6 GHz bands. This architecture may enable a single association process and security context. An AP MLD may include multiple APs each configured to communicate on a respective communication link with a respective one of multiple STAs 104 of a non-AP MLD (also referred to as a "STA MLD"). The STA MLD may communicate with the AP MLD over one or more of the multiple communication links at a given time. MLDs may independently contend for access on each of the communication links, which achieves latency reduction by enabling the MLD to transmit its packets on the first communication link that becomes available.

Another feature of MLO is Traffic Steering and QoS characterization, which achieves latency reduction and other QoS enhancements by mapping traffic flows having different latency or other requirements to different links. For example, traffic with low latency requirements may be mapped to wireless links operating in the 6 GHZ band and more latency-tolerant flows may be mapped to wireless links operating in the 2.4 GHz or 5 GHz bands.

One type of MLO is alternating multi-link, in which a MLD may listen to two different high performance channels at the same time. When an MLD has traffic to send, it may use the first channel with an access opportunity (such as TXOP). While the MLD may only use one channel to receive or transmit at a time, having access opportunities in two different channels provides low latency when networks are congested.

Another type of MLO is multi-link aggregation (MLA), where traffic associated with a single STA 104 is simultaneously transmitted across multiple communication links in parallel to maximize the utilization of available resources to achieve higher throughput. This is akin to carrier aggregation in the cellular space. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN 100. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 5A:
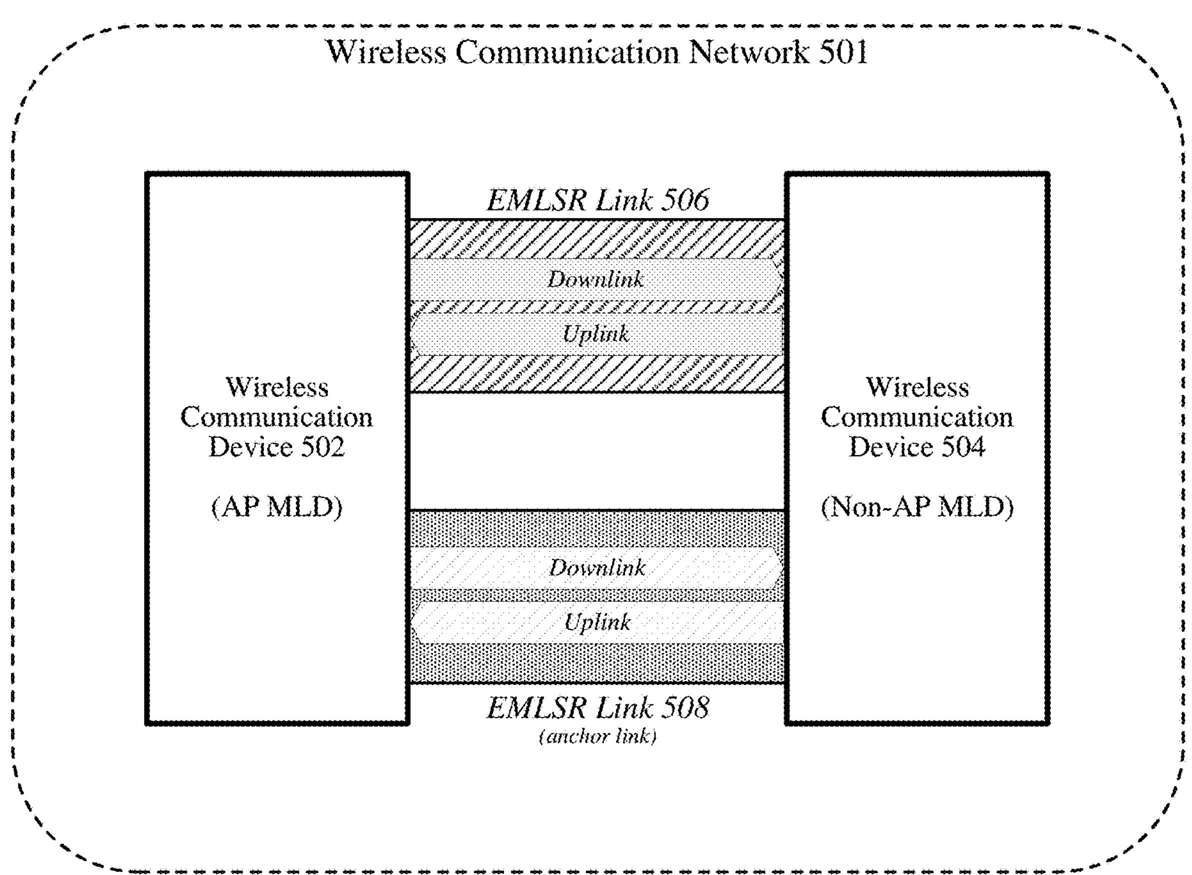
FIG. 5A shows a block diagram illustrating a first example operating environment.

FIG. 5A shows a block diagram illustrating a first example operating environment 500. In the operating environment 500, a wireless communication device 502 and a wireless communication device 504 operate in a wireless communication network 501. The wireless communication network 501 may be a WLAN in which devices such as the wireless communication device 502 and the wireless communication device 504 wirelessly communicate according to protocols and procedures defined in the IEEE 802.11 family of wireless communication standards. In some examples, the wireless communication device 502 may operate as or within a wireless access point (AP) such as the AP 102 described with reference to FIG. 1, and the wireless communication device 504 may operate as or within a wireless station (STA) such as one of the STAs 104 described with reference to FIG. 1. In some examples, in conjunction with wirelessly communicating in the wireless communication network 501, the wireless communication device 502 and the wireless communication device 504 may implement any or all of the protocol data unit 200 described above with reference to FIG. 2, the PPDU 350 described above with reference to FIG. 3, and the hierarchical PPDU format described above with reference to FIG. 4.

In the operating environment 500, the wireless communication device 502 may operate as an AP multi-link device (MLD), and the wireless communication device 504 may operate as a non-AP MLD. According to aspects of the disclosure, the wireless communication devices 502 and 504 may wirelessly communicate with each other via an enhanced multi-link single-radio (EMLSR) link 506 and an EMLSR link 508, and the wireless communication device 504 may use two receive chains to communicate via the EMLSR links 506 and 508 in an enhanced multi-link single-radio (EMLSR) mode. Both the EMLSR link 506 and the EMLSR link 508 may be usable to convey downlink communications from the wireless communication device 502 to the wireless communication device 504, and both the EMLSR link 506 and the EMLSR link 508 may be usable to convey uplink communications from the wireless communication device 504 to the wireless communication device 502.

According to aspects of the disclosure, the wireless communication device 504 may be configured to monitor an anchor link—the EMLSR link 508 in the depicted example—for beacon transmissions from the wireless communication device 502 during recurring beacon transmission intervals. By implementing a 1×1 spatial stream configuration, the wireless communication device 504 may monitor the EMLSR link 508 for such beacon transmissions using one of its receive chains and may concurrently monitor the EMLSR link 506 for other transmissions from the wireless communication device 502 using its other receive chain. While the wireless communication device 504 monitors both of the EMLSR links 506 and 508 using the 1×1 spatial stream configuration, the wireless communication device 502 may send a control transmission on the EMLSR link 506 that indicates a request to send data to the wireless communication device 504 via the EMLSR link 506. To respond to the request and receive the data, the wireless communication device 504 may need to use both receive chains to communicate with the wireless communication device 502 via the EMLSR link 506, according to a 2×2 spatial stream configuration. The wireless communication device 504 may be unable to receive beacons on the EMLSR link 508 during beacon transmission intervals that occur while the wireless communication device 504 uses both receive chains for data communications on the EMLSR link 506 in the 2×2 spatial stream configuration. As such, data communications on the EMLSR link 506 may potentially conflict with beacon reception on the EMLSR link 508.

Figure 5B:
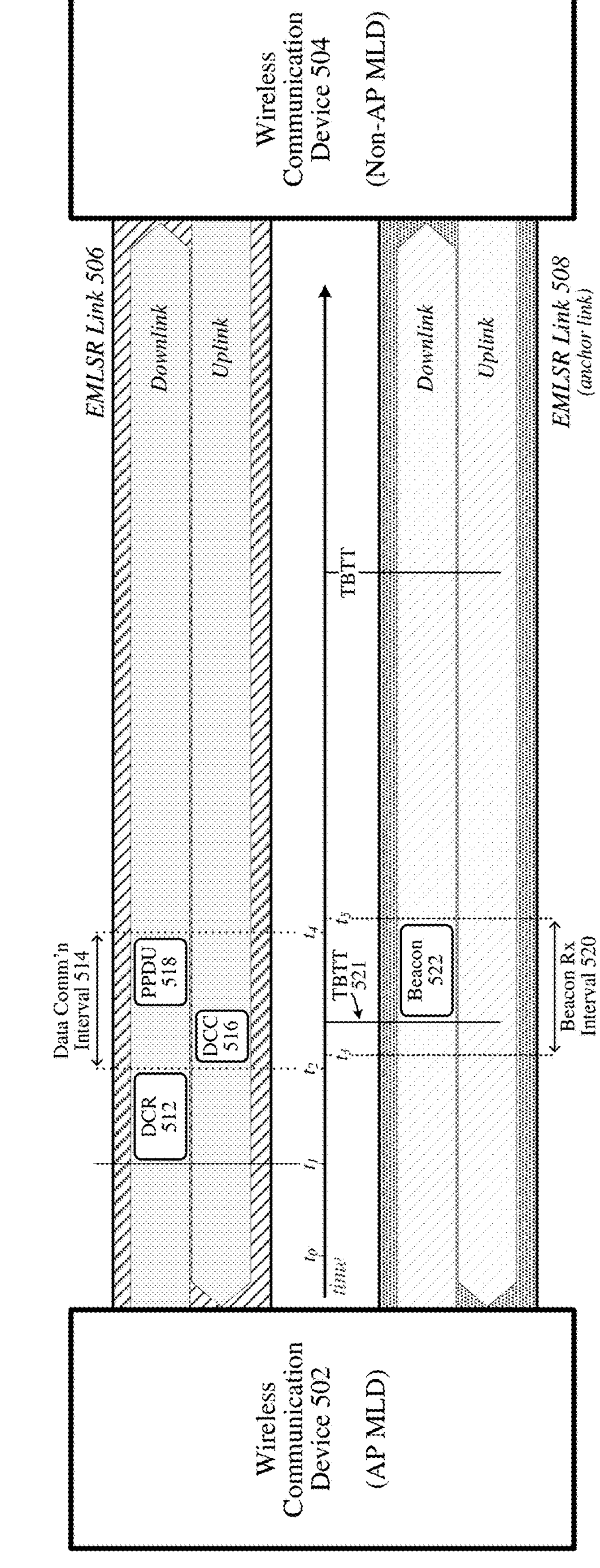
FIG. 5B shows a communications diagram illustrating a first example conflict scenario.

FIG. 5B shows a communications diagram 510 illustrating a first example conflict scenario. In the conflict scenario of FIG. 5B, at an initial time $t_0$, the wireless communication device 504 concurrently monitors the EMLSR links 506 and 508 in the 1×1 spatial stream configuration. At a time $t_1$, having data to send to the wireless communication device 504, the wireless communication device 502 transmits a data communication request (DCR) 512 to the wireless communication device 504 via the EMLSR link 506. In some examples, the data communication request 512 may include a frame that indicates a request to send data to the wireless communication device 504 via the EMLSR link 506. In various examples, the data communication request 512 may include a request-to-send (RTS) frame, such as a multi-user (MU)-RTS.

To respond to the data communication request 512 and receive the data from the wireless communication device 502, the wireless communication device 504 may use both of its receive chains to communicate on the EMLSR link 506 in the 2×2 spatial stream configuration during a data communication interval 514, which may span from a time $t_2$ to a time $t_4$. During the data communication interval 514, the wireless communication device 504 may transmit a data communication clearance (DCC) 516 to the wireless communication device 502 via the EMLSR link 506. In some examples, the data communication clearance 516 may include a frame that indicates that the wireless communication device 502 is clear to send data to the wireless communication device 504 via the EMLSR link 506. In various examples, the data communication clearance 516 may include a clear-to-send (CTS) frame. Following receipt of the data communication clearance 516, and still within the data communication interval 514, the wireless communication device 502 may transmit data to the wireless communication device 504 via the EMLSR link 506 in a PPDU 518.

On the EMLSR link 508, approximately at a target beacon transmission time (TBTT) 521, the wireless communication device 502 may transmit a beacon 522. In various examples, the beacon 522 may include a beacon frame. To successfully receive the beacon 522, the wireless communication device 504 may use one of its receive chains to monitor the EMLSR link 508 in the 1×1 spatial stream configuration during a beacon reception interval 520 that includes the TBTT 521, and spans from a time $t_3$ to a time $t_5$. However, if the wireless communication device 504 applies the 1×1 spatial stream configuration starting at the time $t_3$, it will be unable to apply the 2×2 spatial stream configuration for transmission of the data communication clearance 516 on the EMLSR link 506. As such, beacon reception on the EMLSR link 508 may conflict with data reception on the EMLSR link 506. If the wireless communication device 504 applies the 1×1 spatial stream configuration to receive the beacon 522, and thus does not respond to the data communication request 512, the wireless communication device 502 may conclude that the EMLSR link 506 is bad. If the wireless communication device 504 applies the 2×2 spatial stream configuration to transmit the data communication clearance 516 in response to the data communication request 512, it may drop the beacon 522.

Figure 5C:
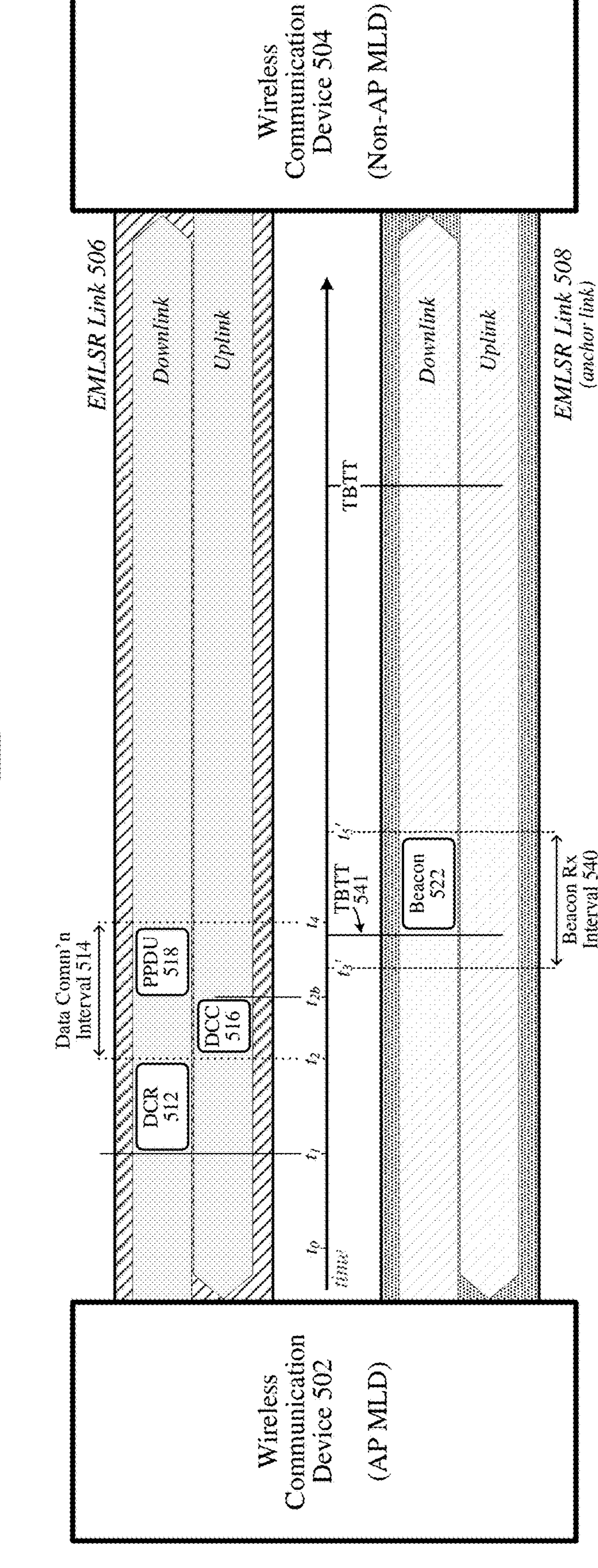
FIG. 5C shows a communications diagram illustrating a second example conflict scenario.

FIG. 5C shows a communications diagram 530 illustrating a second example conflict scenario. In the conflict scenario of FIG. 5C, the wireless communication device 502 may transmit the beacon 522 on the EMLSR link 508 at approximately a TBTT 541 that occurs later than the TBTT 521 of FIG. 5B. To successfully receive the beacon 522, the wireless communication device 504 may use one of its receive chains to monitor the EMLSR link 508 in the 1×1 spatial stream configuration during a beacon reception interval 540 that includes the TBTT 541, and spans from a time $t_3$' to a time $t_5$'. The time $t_3$' may be later than a time $t_{2b}$ by which the wireless communication device 504 could complete the transmission of the data communication clearance 516 on the EMLSR link 506. As such, it may be possible for the wireless communication device 504 to transmit the data communication clearance 516 on the EMLSR link 506 using the 2×2 spatial stream configuration, and then transition to the 1×1 spatial stream configuration to receive the beacon 522 on the EMLSR link 508. However, if the wireless communication device 504 applies the 1×1 spatial stream configuration starting at the time $t_3$', it will be unable to apply the 2×2 spatial stream configuration for reception of the PPDU 518 on the EMLSR link 506. As such, beacon reception on the EMLSR link 508 may still conflict with data reception on the EMLSR link 506.

Figure 5D:
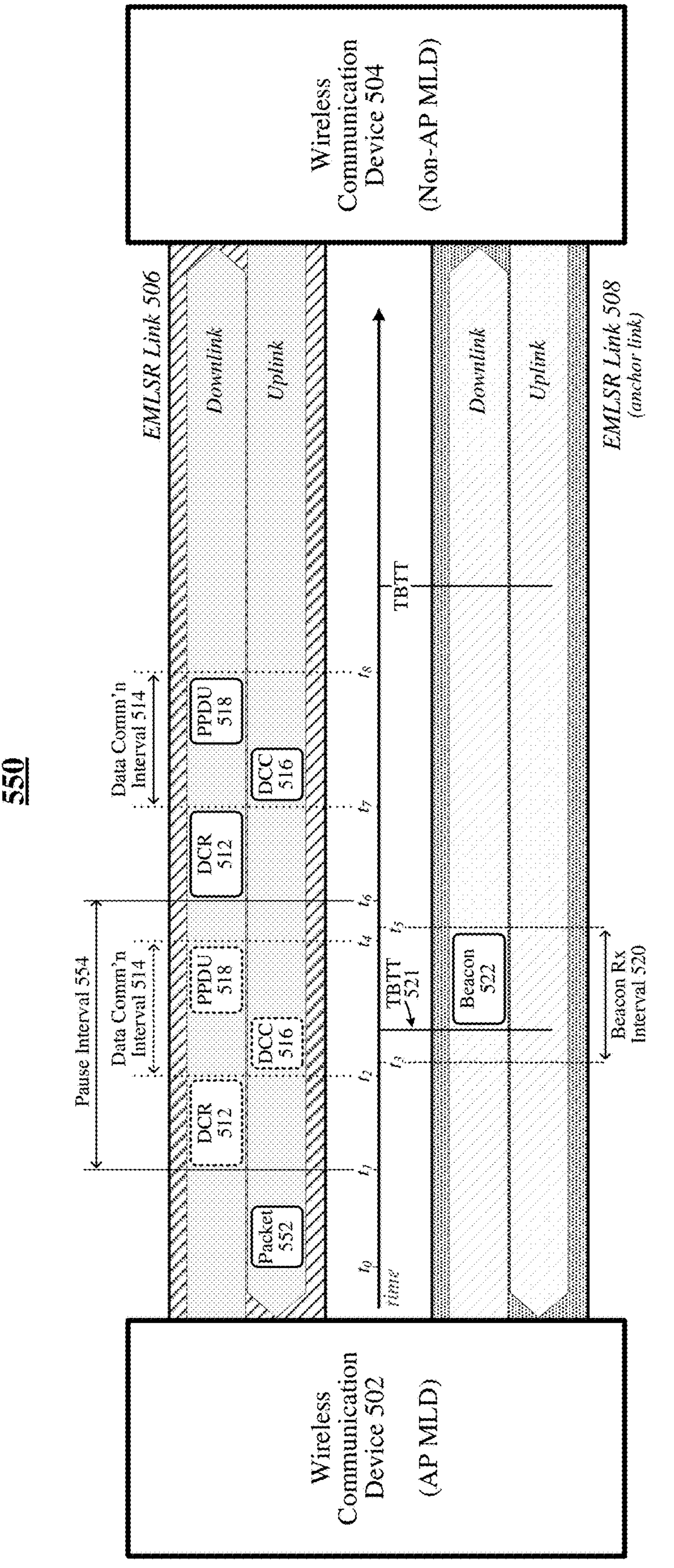
FIG. 5D shows a communications diagram illustrating an example technique for conflict mitigation for EMLSR links between multi-link devices.

FIG. 5D shows a communications diagram 550 illustrating an example technique for conflict mitigation for EMLSR links between multi-link devices. In the scenario depicted in FIG. 5D, a conflict between beacon reception on the EMLSR link 508 and data reception on the EMLSR link 506 is mitigated by implementing a communication pause on the EMLSR link 506. At the time $t_0$, insufficient time may remain to complete a data communication exchange on the EMLSR link 506 prior to the time $t_3$ at which the beacon reception interval 520 begins for the EMLSR link 508. To enable itself to remain in the 1×1 spatial stream configuration and receive the beacon 522 during the beacon reception interval 520 without failing to respond to a prospective data communication request from the wireless communication device 502 or dropping an associated PPDU, the wireless communication device 504 may initiate a communication pause on the EMLSR link 506.

To initiate the communication pause on the EMLSR link 506, the wireless communication device 504 may transmit a packet 552 to the wireless communication device 502 via the EMLSR link 506. Associated with receipt of the packet 552 from the wireless communication device 504, the wireless communication device 502 may refrain from transmitting the data communication request 512 during a pause interval 554, which begins at the time $t_1$ in the depicted example. The packet 552 may indicate a duration of the pause interval 554, and the wireless communication device 504 may select the duration such that the pause interval 554 extends from the time $t_1$ to a time $t_6$ that follows the end of the beacon reception interval 520 at the time $t_5$. After receiving the beacon 522 via the EMLSR link 508 using the 1×1 spatial stream configuration during the beacon reception interval 520, the wireless communication device 504 may remain in the 1×1 spatial stream configuration and receive the data communication request 512 from the wireless communication device 502 via the EMLSR link 506 following the time $t_6$. The wireless communication device 504 may then transition to the 2×2 spatial stream configuration to transmit the data communication clearance 516 and receive the PPDU 518 via the EMLSR link 506 during the data communication interval 514, which may span from a time $t_7$ to a time $t_8$.

Figure 6:
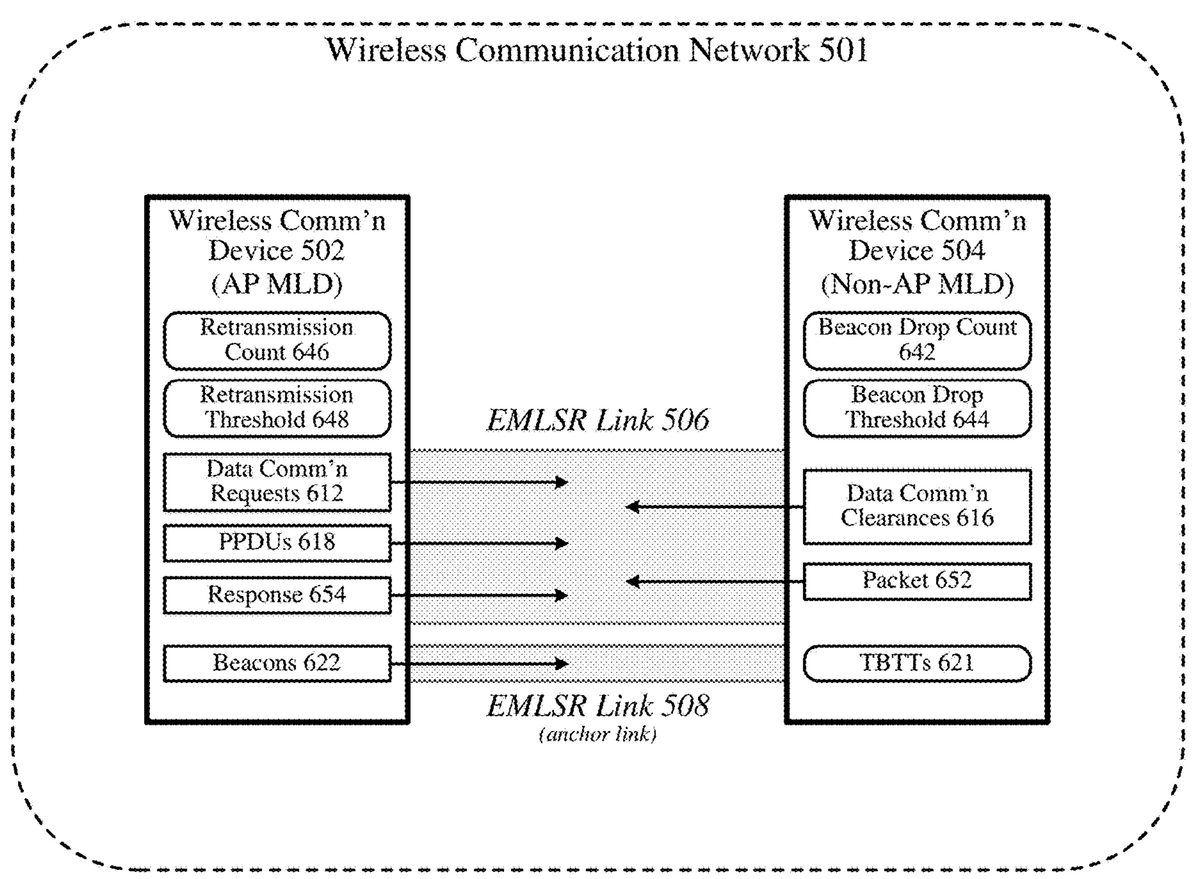
FIG. 6 shows a block diagram illustrating a second example operating environment.

FIG. 6 shows a block diagram illustrating a second example operating environment 600. In the operating environment 600, the wireless communication devices 502 and 504 may mitigate conflicts such as those described in conflict scenarios 510 and 530 by implementing conflict mitigation techniques for EMLSR links between multi-link devices. In the operating environment 600, the wireless communication device 502 may recurringly transmit beacons 622 on the EMLSR link 508. According to aspects of the disclosure, the wireless communication device 502 may transmit the beacons 622 approximately at TBTTs 621 that are known to (or determinable by) the wireless communication device 504. In some examples, the wireless communication device 504 may receive the beacons 622 via the EMLSR link 508 using a 1×1 spatial stream configuration.

In various examples, the wireless communication device 502 may transmit data communication requests 612 to the wireless communication device 504 via the EMLSR link 506 to initiate data communication exchanges, during which the wireless communication device 502 may send data to the wireless communication device 504 by including the data in PPDUs 618 that the wireless communication device 502 transmits to the wireless communication device 504 via the EMLSR link 506. In some examples, the wireless communication device 504 may receive the data communication requests 612 via the EMLSR link 506 using the 1×1 spatial stream configuration. In various examples, the data communication requests 612 may include multi-user request-to-send (MU-RTS) frames. In various examples, the wireless communication device 504 may complete the data communication exchanges by transmitting data communication clearances 616 to the wireless communication device 502 and receiving PPDUs 618 from the wireless communication device 502 via the EMLSR link 506, using a 2×2 spatial stream configuration. In some examples, the data communication clearances 616 may include clear-to-send (CTS) frames.

According to aspects of the disclosure, in the operating environment 600, the wireless communication devices 502 and 504 may implement communication pauses on the EMLSR link 506 selectively, to prioritize receipt of the beacons 622 on the EMLSR link 508 when the EMLSR link 508 is (or is likely to be) in a degraded state, while prioritizing data communications on the EMLSR link 506 and allowing the beacons 622 to be dropped when the EMLSR link 508 is (or is likely to be) in good condition. In various examples, the wireless communication device 504 may maintain a beacon drop count 642 that represents a number of beacon transmissions that it has dropped on the EMLSR link 508 since its last successful receipt of one of the beacons 622. According to aspects of the disclosure, when there is a conflict between a beacon reception interval for the EMLSR link 508 and a data communication interval for the EMLSR link 506 while the beacon drop count 642 does not satisfy a beacon drop threshold 644, the wireless communication device 504 may prioritize data communications by knowingly dropping a beacon 622 transmitted on the EMLSR link 508 during the beacon reception interval to transmit a data communication clearance 616 and receive a PPDU 618 via the EMLSR link 506 using the 2×2 spatial stream configuration during the conflicting data communication interval. Associated with knowingly dropping the beacon 622, the wireless communication device 504 may update the beacon drop count 642 to reflect the dropping of the beacon 622.

According to aspects of the disclosure, the wireless communication device 504 may be configured to initiate a communication pause for the EMLSR link 506 if the beacon drop count 642—once updated—satisfies the beacon drop threshold 644. The beacon drop threshold 644 may represent or be associated with a number of the beacons 622 on the EMLSR link 508 that the wireless communication device 504, having successfully received a beacon 622, may knowingly drop before needing to initiate a communication pause for the EMLSR link 506. In various examples, the wireless communication device 504 may select the beacon drop threshold 644. In some examples, the wireless communication device 504 may select the beacon drop threshold 644 with reference to a beacon drop tolerance X associated with the EMLSR link 508. According to aspects of the disclosure, the beacon drop tolerance X may represent or be associated with an estimated or expected number of beacon intervals over which the EMLSR link 508 may be sustained without the wireless communication device 504 receiving a beacon 622. In some examples, the wireless communication device 504 may use the beacon drop tolerance X as the beacon drop threshold 644. In various other examples, the wireless communication device 504 may select the beacon drop threshold 644 based on the beacon drop tolerance X according to Equation (1) as follows:

$$B = X - \Delta \tag{1}$$

where B represents the beacon drop threshold 644, and Δ represents a reduction applied to account for the possibility of some of the beacons 622 being dropped unintentionally (due to noise, beacon drift, or other factors, for example).

In various examples, in accordance with the beacon drop count 642—once updated—satisfying the beacon drop threshold 644, the wireless communication device 504 may initiate the communication pause for the EMLSR link 506 by transmitting a packet to the wireless communication device 502 via the EMLSR link 506. In some examples, transmitting the packet 652 to the wireless communication device 502 via the EMLSR link 506 may cause the wireless communication device 502 to refrain from data transmissions on the EMLSR link 506 for a duration of the communication pause. In various examples, the packet 652 may include an indication of the duration of the communication pause. In some examples, the wireless communication device 504 may select the duration of the communication pause so that the wireless communication device 502 will refrain from data transmissions on the EMLSR link 506 until after the end of a beacon reception interval including a next TBTT 621 of the EMLSR link 508.

In various examples, the packet 652 may include a request-to-send (RTS) frame. In some other examples, the packet 652 may include a CTS-to-self frame. In yet other examples, the packet 652 may include a quality-of-service (QoS) null frame. In some examples, the packet 652 may include a QoS null frame that includes a power management (PM) subfield indicating that the wireless communication device 504 is to operate in a power saving (PS) mode. In various examples, associated with receipt of the packet 652 from the wireless communication device 504 via the EMLSR link 506, the wireless communication device 502 may transmit a response 654 to the wireless communication device 504 via the EMLSR link 506. In some examples, the response 654 may include a frame that the wireless communication device 502 sends to the wireless communication device 504 in response to or with reference to a frame included in the packet 652. In various examples, the packet 652 may include an RTS frame, and the response 654 may include a CTS frame.

In various examples, the packet 652 may include a frame—such as an RTS frame or a CTS-to-self frame—including a network allocation vector (NAV) indicating a duration of the communication pause for the EMLSR link 508. In some examples, the wireless communication device 504 may set the NAV in accordance with any or all of an MU-RTS reception interval duration, a CTS transmission interval duration, a PPDU reception interval duration, and a beacon reception interval duration. In some examples, the wireless communication device 504 may set the NAV in accordance with a sum of the MU-RTS reception interval duration, the CTS transmission interval duration, the PPDU reception interval duration, and the beacon reception interval duration. The MU-RTS reception interval duration may represent or be associated with an amount of time that is estimated or expected to elapse over the course of reception by the wireless communication device 504 of a data communication request 612 including an MU-RTS frame transmitted on the EMLSR link 506 by the wireless communication device 502. The CTS transmission interval duration may represent or be associated with an amount of time that is estimated or expected to elapse over the course of transmission of a data communication clearance 616 including a CTS frame by the wireless communication device 504 to the wireless communication device 502 via the EMLSR link 506. The PPDU reception interval duration may represent or be associated with an amount of time that is estimated or expected to elapse over the course of reception by the wireless communication device 504 of a PPDU 618 transmitted on the EMLSR link 506 by the wireless communication device 502. The beacon reception interval duration may represent or be associated with a duration of a beacon reception interval during which the wireless communication device 504 is to receive a beacon 622 via the EMLSR link 508.

According to aspects of the disclosure, the wireless communication device 504 may reset the beacon drop count 642 in association with the transmission of the packet 652 to the wireless communication device 502. In various examples, in accordance with a conflict, subsequent to the reset of the beacon drop count 642, between another beacon reception interval for the EMLSR link 508 and another data communication interval for the EMLSR link 506, the wireless communication device 504 may once again update the beacon drop count 642. In some examples, in accordance with the again-updated beacon drop count 642 not satisfying the beacon drop threshold 644, the wireless communication device 504 may refrain from initiating another communication pause for the EMLSR link 506.

In some examples, during a data communication exchange on the EMLSR link 506 following the transmission of the packet 652 and the implementation of the communication pause on the EMLSR link 506, the wireless communication device 504 may receive from the wireless communication device 502, via the EMLSR link 506, a packet that includes an MU-RTS frame. According to aspects of the disclosure, the wireless communication device 504 may be configured to drop a second MU-RTS frame that the wireless communication device 502 transmits to the wireless communication device 504 via the EMLSR link 508 if the wireless communication device 502 transmits the second MU-RTS frame during the data communication exchange on the EMLSR link 506. In various examples, the wireless communication device 502 may be configured to refrain from multicast data transmissions on the EMLSR link 508 during unicast data transmissions on the EMLSR link 506.

In some examples, the wireless communication device 502 may maintain a retransmission count 646 that represents a number of retransmissions of data communication requests 612 (such as may include MU-RTS frames), PPDUs 618, or both, that it has performed on the EMLSR link 506 since a given point in time. According to aspects of the disclosure, when the wireless communication device 502 retransmits a data communication request 612 or a PPDU 618 on the EMLSR link 506, it may update the retransmission count 646 and check whether the updated retransmission count 646 satisfies a retransmission threshold 648. In various examples, associated with the retransmission count 646 satisfying the retransmission threshold, the wireless communication device 502 may initiate a conflict mitigation procedure. In various examples, the wireless communication device 502 may initiate the conflict mitigation procedure in accordance with the retransmission count 646 satisfying the retransmission threshold 648 and the wireless communication device 504 being in an active mode on the EMLSR link 506 and on the EMLSR link 508. In some examples, in accordance with the conflict mitigation procedure, the wireless communication device 502 may monitor for conflicts between data communication intervals for the EMLSR link 506 and beacon reception intervals for the EMLSR link 508.

In various examples, associated with an existence, subsequent to initiation of the conflict mitigation procedure, of a conflict between a data communication interval for the EMLSR link 506 and a beacon reception interval for the EMLSR link 508, the wireless communication device 502 may delay a transmission of a data communication request 612 (such as may contain an MU-RTS frame) on the EMLSR link 506. In some examples, the wireless communication device 502 may delay the transmission of the data communication request 612 on the EMLSR link 506 until after a completion of the beacon reception interval for the EMLSR link 508. In various examples, in association with delaying the transmission of the data communication request 612 on the EMLSR link 506, the wireless communication device 502 may reset the retransmission count 646.

Figure 7:
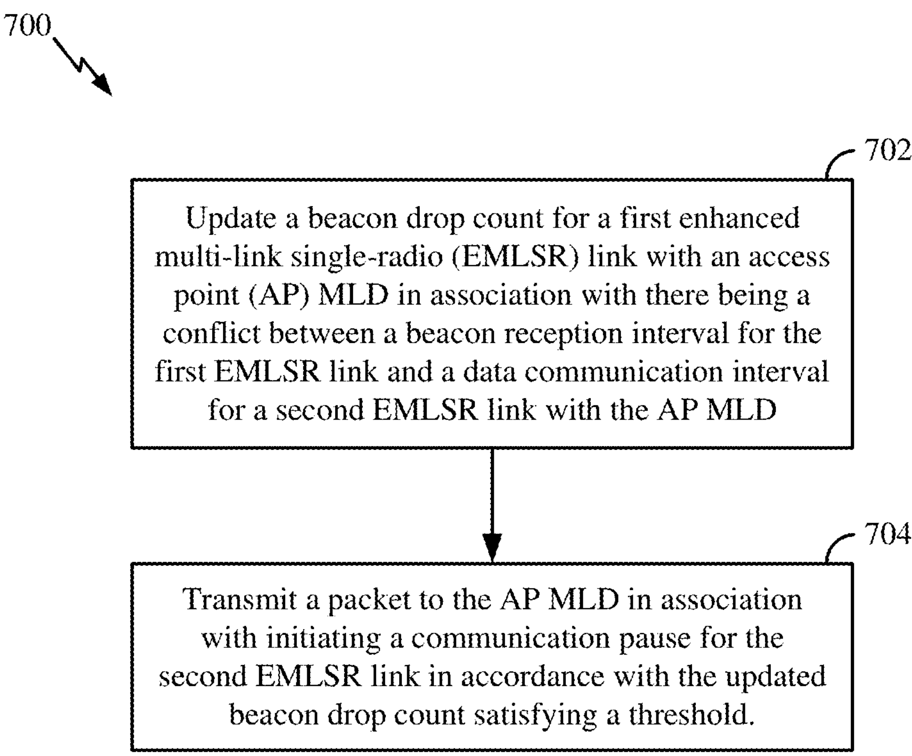
FIG. 7 shows a flowchart illustrating an example process performable by or at a wireless station that supports conflict mitigation for enhanced multi-link single-radio (EMLSR) links between multi-link devices.

FIG. 7 shows a flowchart illustrating an example process 700 performable by or at a wireless communication device that supports conflict mitigation for EMLSR links between multi-link devices. The operations of the process 700 may be implemented by a wireless station or its components as described herein. For example, the process 700 may be performed by a wireless communication device, such as the wireless communication device 504 described above with reference to FIGS. 5A, 5B, 5C, 5D, and 6, or the wireless communication device 900 described below with reference to FIG. 9, operating as or within a non-AP MLD. In some examples, the process 700 may be performed by a wireless station such as one of the wireless STAs 104 described with reference to FIG. 1.

In some examples, in block 702, the wireless communication device may update a beacon drop count for a first enhanced multi-link single-radio (EMLSR) link with an access point (AP) MLD in association with there being a conflict between a beacon reception interval for the first EMLSR link and a data communication interval for a second EMLSR link with the AP MLD. For example, in the operating environment 600 of FIG. 6, the wireless communication device 504 may update the beacon drop count 642 for the EMLSR link 508 with the wireless communication device 502 in association with there being a conflict between a beacon reception interval for the EMLSR link 508 and a data communication interval for the EMLSR link 506.

In some examples, in block 704, the wireless communication device may transmit a packet to the AP MLD in association with initiating a communication pause for the second EMLSR link in accordance with the updated beacon drop count satisfying a threshold. For example, in the operating environment 600 of FIG. 6, the wireless communication device 504 may transmit the packet 652 to the wireless communication device 502 in association with initiating a communication pause for the EMLSR link 506 in accordance with the updated beacon drop count 642 satisfying the beacon drop threshold 644. In some examples, the packet may include an RTS frame or a CTS-to-self frame. In some examples, the packet may include a frame including an NAV indicating a duration of the communication pause. In some such examples, the wireless communication device may set the NAV in accordance with an MU-RTS reception interval duration, a CTS transmission interval duration, a PPDU reception interval duration, or a beacon reception interval duration. In some examples, the packet may include a QoS null frame. In some such examples, the QoS null frame may include a PM subfield indicating that the wireless communication device is to operate in a PS mode.

In some examples, the wireless communication device may reset the beacon drop count in association with the transmission of the packet to the AP MLD. In some examples, the wireless communication device may update the beacon drop count again in accordance with a conflict, subsequent to the reset of the beacon drop count, between a second beacon reception interval for the first EMLSR link and a second data communication interval for the second EMLSR link. In some examples, the wireless communication device 504 may refrain from initiating a second communication pause for the second EMLSR link in accordance with the again-updated beacon drop count not satisfying the threshold.

In some examples, the wireless communication device 504 may receive, from the AP MLD via the second EMLSR link, during a data communication exchange on the second EMLSR link, a second packet that includes a first MU-RTS frame. In some examples, the wireless communication device may drop a second MU-RTS frame transmitted on the first EMLSR link by the AP MLD during the data communication exchange on the second EMLSR link.

Figure 8:
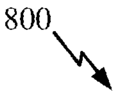
FIG. 8 shows a flowchart illustrating an example process performable by or at a wireless access point that supports conflict mitigation for EMLSR links between multi-link devices.

FIG. 8 shows a flowchart illustrating an example process 800 performable by or at a wireless communication device that supports conflict mitigation for EMLSR links between multi-link devices. The operations of the process 800 may be implemented by a wireless access point or its components as described herein. For example, the process 800 may be performed by a wireless communication device, such as the wireless communication device 502 described above with reference to FIGS. 5A, 5B, 5C, 5D, and 6, or the wireless communication device 1000 described below with reference to FIG. 10, operating as or within an AP MLD. In some examples, the process 800 may be performed by a wireless access point such as a wireless AP 102 described with reference to FIG. 1.

In some examples, in block 802, the wireless communication device may update a retransmission count for a first enhanced multi-link single-radio (EMLSR) link with a non-AP MLD in association with a retransmission of a multi-user request-to-send (MU-RTS) frame of a data communication exchange with the non-AP MLD over the first EMLSR link or a retransmission of a physical layer protocol data unit (PPDU) of the data communication exchange with the non-AP MLD over the first EMLSR link. For example, in the operating environment 600 of FIG. 6, the wireless communication device 502 may update the retransmission count 646 for the EMLSR link 506 with the wireless communication device 504 in association with a retransmission of an MU-RTS frame of a data communication exchange with the wireless communication device 504 over the EMLSR link 506 or a retransmission of a PPDU 618 of the data communication exchange with the wireless communication device 504 over the EMLSR link 506.

In some examples, in block 804, the wireless communication device may monitor, in accordance with a conflict mitigation procedure associated with the updated retransmission count satisfying a threshold, for conflicts between data communication intervals for the first EMLSR link and beacon reception intervals for a second EMLSR link with the non-AP MLD. For example, in the operating environment 600 of FIG. 6, the wireless communication device 502 may monitor, in accordance with a conflict mitigation procedure associated with the updated retransmission count 646 satisfying the retransmission threshold 648, for conflicts between data communication intervals for the EMLSR link 506 and beacon reception intervals for the EMLSR link 508 with the wireless communication device 504.

In some examples, the wireless communication device may delay an MU-RTS transmission associated with an existence, subsequent to initiation of the conflict mitigation procedure, of a conflict between a data communication interval for the first EMLSR link and a beacon reception interval for the second EMLSR link. In some examples, the wireless communication device may delay the MU-RTS transmission until after a completion of the beacon reception interval for the second EMLSR link. In some examples, the wireless communication device may reset the retransmission count in association with the delaying of the MU-RTS transmission.

In some examples, the wireless communication device may initiate the conflict mitigation procedure in accordance with the retransmission count satisfying the threshold value and the non-AP MLD being in an active mode on the first EMLSR link and on the second EMLSR link. In some examples, the wireless communication device may refrain from multicast data transmissions on the second EMLSR link during unicast data transmissions on the first EMLSR link.

Figure 9:
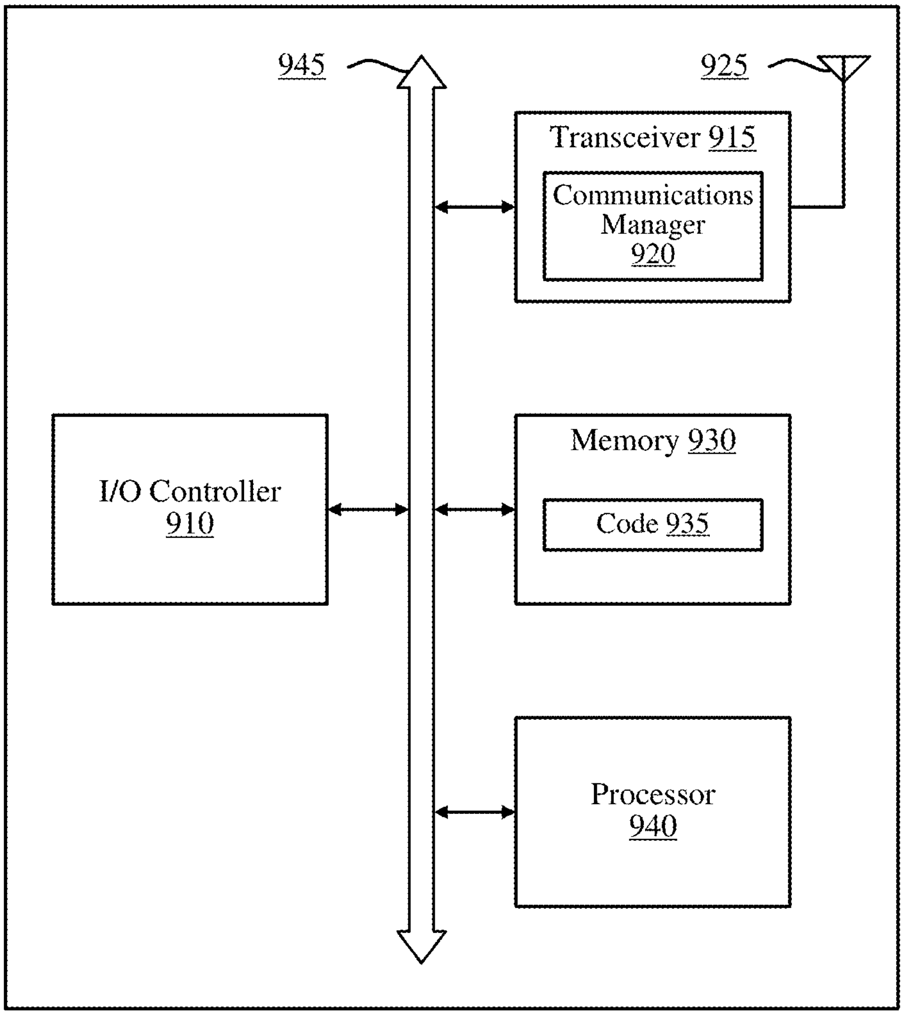
FIG. 9 shows a block diagram of a first example wireless communication device that supports conflict mitigation for EMLSR links between multi-link devices.

FIG. 9 shows a block diagram of a first example wireless communication device 900 that supports conflict mitigation for EMLSR links between multi-link devices. In some implementations, the wireless communication device 900 may be configured to perform the process 700 described above with reference to FIG. 7. The wireless communication device 900 may be an example implementation of wireless communication device 504 of FIGS. 5A, 5B, 5C, 5D, and 6. In some implementations, the wireless communication device 900 may be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory"). In some implementations, the wireless communication device 900 may be a device for use in a wireless STA, such as one of the wireless STAs 104 described above with reference to FIG. 1. In other implementations, the wireless communication device 900 may be a wireless STA that includes such a chip, SoC, chipset package or device as well as at least one antenna.

In some implementations, the wireless communication device 900 may be capable of transmitting and receiving wireless communications in the form of, for example, wireless packets. For example, the wireless communication device may be configured or operable to transmit and receive packets in the form of physical layer PPDUs and MPDUs conforming to one or more of the IEEE 802.11 family of wireless communication protocol standards. The wireless communication device 900 may include components for bi-directional communications including components for transmitting and receiving communications, such as a communications manager 920, an input/output (I/O) controller 910, a transceiver 915, an antenna 925, a memory 930, code 935 and a processor 940. These components may be in electronic communication or otherwise coupled (such as operatively, communicatively, functionally, electronically, electrically) via one or more buses (such as a bus 945). In some implementations, the wireless communication device 900 may further include a user interface (UI) (such as a touchscreen or keypad) and a display, which may be integrated with the UI to form a touchscreen display. In some implementations, the wireless communication device 900 may further include one or more sensors such as, for example, one or more inertial sensors, accelerometers, temperature sensors, pressure sensors or altitude sensors.

The I/O controller 910 may manage input and output signals for the wireless communication device 900. The I/O controller 910 also may manage peripherals not integrated into the wireless communication device 900. In some implementations, the I/O controller 910 may represent a physical connection or port to an external peripheral. In some implementations, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some implementations, the I/O controller 910 may be implemented as part of a processor or processing system, such as the processor 940. In some implementations, a user may interact with the wireless communication device 900 via the I/O controller 910 or via hardware components controlled by the I/O controller 910.

In some implementations, the wireless communication device 900 may include a single antenna 925. However, in some other implementations, the wireless communication device 900 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925.

In some implementations, the transceiver 915 may include one or more interfaces, such as one or more interfaces coupled with the one or more antennas 925 that are configured to support various receiving or obtaining operations, or one or more interfaces coupled with the one or more antennas 925 that are configured to support various transmitting or outputting operations, or a combination thereof. In some implementations, the transceiver 915 may include or be configured for coupling with one or more processors or memory components that are operable to perform or support operations associated with received or obtained information or signals, or to generate information or other signals for transmission or other outputting, or any combination thereof. In some implementations, the transceiver 915, or the transceiver 915 and the one or more antennas 925, or the transceiver 915 and the one or more antennas 925 and one or more processors or memory components (for example, the processor 940, or the memory 930, or both), may be included in a chip or chip assembly that is installed in the wireless communication device 900.

The memory 930 may include random access memory (RAM) and read-only memory (ROM). The memory 930 may store computer-readable, computer-executable code 935 including instructions that, when executed by the processor 940, cause the wireless communication device 900 to perform various functions described herein. The code 935 may be stored in a non-transitory computer-readable medium such as system memory or another type of memory. In some implementations, the code 935 may not be directly executable by the processor 940 but may cause a computer (for example, when compiled and executed) to perform functions described herein. In some implementations, the memory 930 may contain, among other things, a basic I/O system (BIOS) which may control basic hardware or software operation such as the interaction with peripheral components or devices.

The processor 940 may be any one or more suitable processors capable of executing scripts or instructions of one or more software programs stored in the wireless communication device 900 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the wireless communication device 900). For example, a processing system of the wireless communication device 900 may refer to a system including the various other components or subcomponents of the wireless communication device 900, such as the processor 940, or the transceiver 915, or the communications manager 920, or other components or combinations of components of the wireless communication device 900.

The processing system of the wireless communication device 900 may interface with other components of the wireless communication device 900, and may process information received from other components (such as inputs or signals) or output information to other components. For example, a chip or modem of the wireless communication device 900 may include a processing system, a first interface to output information and a second interface to obtain information. In some implementations, the first interface may refer to an interface between the processing system of the chip or modem and a transmitter, such that the wireless communication device 900 may transmit information output from the chip or modem. In some implementations, the second interface may refer to an interface between the processing system of the chip or modem and a receiver, such that the wireless communication device 900 may obtain information or signal inputs, and the information may be passed to the processing system. A person having ordinary skill in the art will readily recognize that the first interface also may obtain information or signal inputs, and the second interface also may output information or signal outputs.

The communications manager 920 may support wireless communication by wireless communication device 900 in accordance with examples as disclosed herein. In some implementations, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some implementations, one or more functions described with reference to the communications manager 920 may be supported by or performed by the processor 940, the memory 930, the code 935, or any combination thereof. For example, the code 935 may include instructions executable by the processor 940 to cause the wireless communication device 900 to perform various aspects of conflict mitigation for EMLSR links between multi-link devices as described herein, or the processor 940 and the memory 930 may be otherwise configured to perform or support such operations.

In some examples, the communications manager 920 may be configured as or otherwise support a means for updating a beacon drop count for a first EMLSR link with an AP MLD in association with there being a conflict between a beacon reception interval for the first EMLSR link and a data communication interval for a second EMLSR link with the AP MLD.

In some examples, the communications manager 920 may be configured as or otherwise support a means for transmitting a packet to the AP MLD in association with initiating a communication pause for the second EMLSR link in accordance with the updated beacon drop count satisfying a threshold. In some examples, the packet may include an RTS frame or a CTS-to-self frame. In some examples, the packet may include a frame including an NAV indicating a duration of the communication pause. In some such examples, the communications manager 920 may be configured as or otherwise support a means for setting the NAV in accordance with an MU-RTS reception interval duration, a CTS transmission interval duration, a PPDU reception interval duration, or a beacon reception interval duration. In some examples, the packet may include a QoS null frame. In some such examples, the QoS null frame may include a PM subfield indicating that a non-AP MLD corresponding to wireless communication device 900 is to operate in a PS mode.

In some examples, the communications manager 920 may be configured as or otherwise support a means for resetting the beacon drop count in association with the transmission of the packet to the AP MLD. In some examples, the communications manager 920 may be configured as or otherwise support a means for updating the beacon drop count again in accordance with a conflict, subsequent to the reset of the beacon drop count, between a second beacon reception interval for the first EMLSR link and a second data communication interval for the second EMLSR link. In some examples, the communications manager 920 may be configured as or otherwise support a means for refraining from initiating a second communication pause for the second EMLSR link in accordance with the again-updated beacon drop count not satisfying the threshold.

In some examples, the communications manager 920 may be configured as or otherwise support a means for receiving, from the AP MLD via the second EMLSR link, during a data communication exchange on the second EMLSR link, a second packet that includes a first MU-RTS frame. In some examples, the communications manager 920 may be configured as or otherwise support a means for dropping a second MU-RTS frame transmitted on the first EMLSR link by the AP MLD during the data communication exchange on the second EMLSR link.

Figure 10:
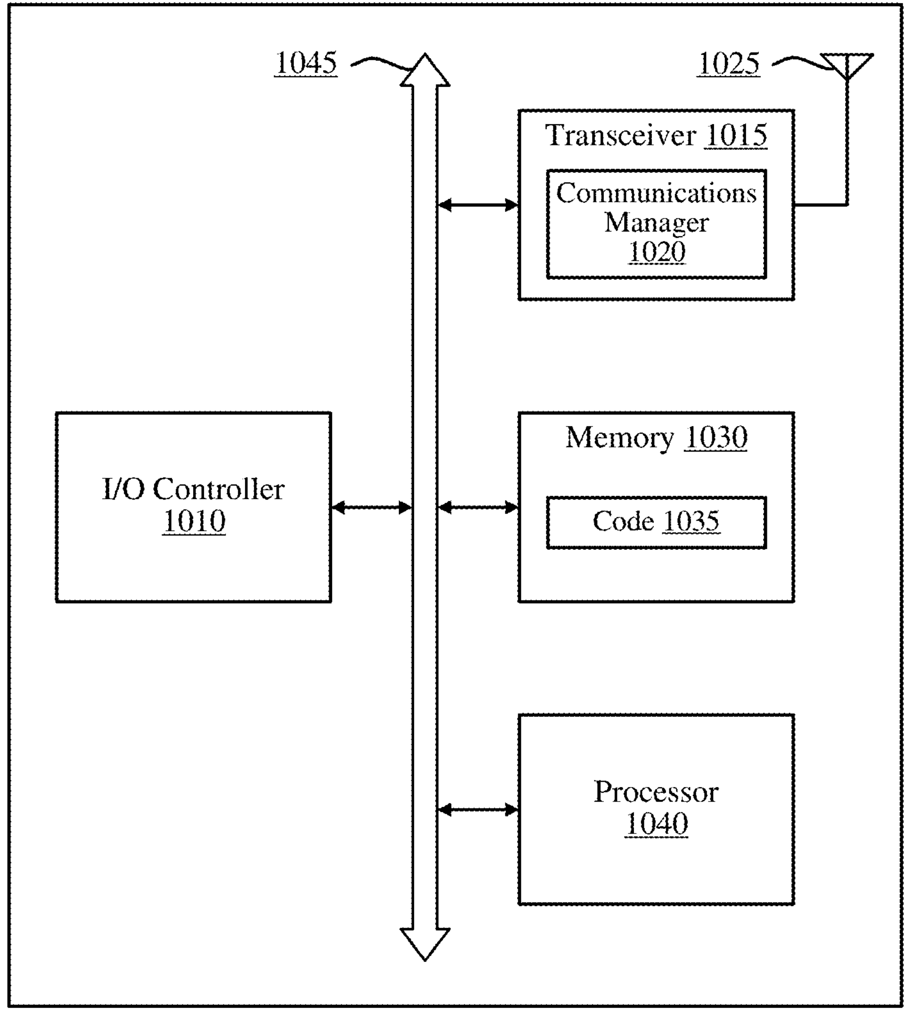
FIG. 10 shows a block diagram of a second example wireless communication device that supports conflict mitigation for EMLSR links between multi-link devices.
Figure 10:
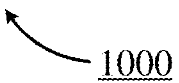

FIG. 10 shows a block diagram of a second example wireless communication device 1000 that supports conflict mitigation for EMLSR links between multi-link devices. In some implementations, the wireless communication device 1000 may be configured to perform the process 800 described above with reference to FIG. 8. The wireless communication device 1000 may be an example implementation of wireless communication device 502 of FIGS. 5A, 5B, 5C, 5D, and 6. In some implementations, the wireless communication device 1000 may be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory"). In some implementations, the wireless communication device 1000 may be a device for use in a wireless AP, such as the wireless AP 102 described above with reference to FIG. 1. In other implementations, the wireless communication device 1000 may be a wireless AP that includes such a chip, SoC, chipset package or device as well as at least one antenna.

In some implementations, the wireless communication device 1000 may be capable of transmitting and receiving wireless communications in the form of, for example, wireless packets. For example, the wireless communication device may be configured or operable to transmit and receive packets in the form of physical layer PPDUs and MPDUs conforming to one or more of the IEEE 802.11 family of wireless communication protocol standards. The wireless communication device 1000 may include components for bi-directional communications including components for transmitting and receiving communications, such as a communications manager 1020, an input/output (I/O) controller 1010, a transceiver 1015, an antenna 1025, a memory 1030, code 1035 and a processor 1040. These components may be in electronic communication or otherwise coupled (such as operatively, communicatively, functionally, electronically, electrically) via one or more buses (such as a bus 1045).

The I/O controller 1010 may manage input and output signals for the wireless communication device 1000. The I/O controller 1010 also may manage peripherals not integrated into the wireless communication device 1000. In some implementations, the I/O controller 1010 may represent a physical connection or port to an external peripheral. In some implementations, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some implementations, the I/O controller 1010 may be implemented as part of a processor or processing system, such as the processor 1040. In some implementations, a user may interact with the wireless communication device 1000 via the I/O controller 1010 or via hardware components controlled by the I/O controller 1010.

In some implementations, the wireless communication device 1000 may include a single antenna 1025. However, in some other implementations, the wireless communication device 1000 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 also may include a modem to modulate the packets, to provide the modulated packets to one or more antennas 1025 for transmission, and to demodulate packets received from the one or more antennas 1025.

In some implementations, the transceiver 1015 may include one or more interfaces, such as one or more interfaces coupled with the one or more antennas 1025 that are configured to support various receiving or obtaining operations, or one or more interfaces coupled with the one or more antennas 1025 that are configured to support various transmitting or outputting operations, or a combination thereof. In some implementations, the transceiver 1015 may include or be configured for coupling with one or more processors or memory components that are operable to perform or support operations associated with received or obtained information or signals, or to generate information or other signals for transmission or other outputting, or any combination thereof. In some implementations, the transceiver 1015, or the transceiver 1015 and the one or more antennas 1025, or the transceiver 1015 and the one or more antennas 1025 and one or more processors or memory components (for example, the processor 1040, or the memory 1030, or both), may be included in a chip or chip assembly that is installed in the wireless communication device 1000.

The memory 1030 may include random access memory (RAM) and read-only memory (ROM). The memory 1030 may store computer-readable, computer-executable code 1035 including instructions that, when executed by the processor 1040, cause the wireless communication device 1000 to perform various functions described herein. The code 1035 may be stored in a non-transitory computer-readable medium such as system memory or another type of memory. In some implementations, the code 1035 may not be directly executable by the processor 1040 but may cause a computer (for example, when compiled and executed) to perform functions described herein. In some implementations, the memory 1030 may contain, among other things, a basic I/O system (BIOS) which may control basic hardware or software operation such as the interaction with peripheral components or devices.

The processor 1040 may be any one or more suitable processors capable of executing scripts or instructions of one or more software programs stored in the wireless communication device 1000 (such as within the memory 1030). In some implementations, the processor 1040 may be a component of a processing system. A processing system may generally refer to a system or series of machines or components that receives inputs and processes the inputs to produce a set of outputs (which may be passed to other systems or components of, for example, the wireless communication device 1000). For example, a processing system of the wireless communication device 1000 may refer to a system including the various other components or subcomponents of the wireless communication device 1000, such as the processor 1040, or the transceiver 1015, or the communications manager 1020, or other components or combinations of components of the wireless communication device 1000.

The processing system of the wireless communication device 1000 may interface with other components of the wireless communication device 1000, and may process information received from other components (such as inputs or signals) or output information to other components. For example, a chip or modem of the wireless communication device 1000 may include a processing system, a first interface to output information and a second interface to obtain information. In some implementations, the first interface may refer to an interface between the processing system of the chip or modem and a transmitter, such that the wireless communication device 1000 may transmit information output from the chip or modem. In some implementations, the second interface may refer to an interface between the processing system of the chip or modem and a receiver, such that the wireless communication device 1000 may obtain information or signal inputs, and the information may be passed to the processing system. A person having ordinary skill in the art will readily recognize that the first interface also may obtain information or signal inputs, and the second interface also may output information or signal outputs.

The communications manager 1020 may support wireless communication by wireless communication device 1000 in accordance with examples as disclosed herein. In some implementations, the communications manager 1020 may be configured to perform various operations (for example, receiving, monitoring, transmitting) using or otherwise in cooperation with the transceiver 1015, the one or more antennas 1025, or any combination thereof. Although the communications manager 1020 is illustrated as a separate component, in some implementations, one or more functions described with reference to the communications manager 1020 may be supported by or performed by the processor 1040, the memory 1030, the code 1035, or any combination thereof. For example, the code 1035 may include instructions executable by the processor 1040 to cause the wireless communication device 1000 to perform various aspects of conflict mitigation for EMLSR links between multi-link devices as described herein, or the processor 1040 and the memory 1030 may be otherwise configured to perform or support such operations.

In some examples, the communications manager 1020 may be configured as or otherwise support a means for updating a retransmission count for a first EMLSR link with a non-AP MLD in association with a retransmission of an MU-RTS frame of a data communication exchange with the non-AP MLD over the first EMLSR link or a retransmission of a PPDU of a the data communication exchange with the non-AP MLD over the first EMLSR link. In some examples, the communications manager 1020 may be configured as or otherwise support a means for monitoring, in accordance with a conflict mitigation procedure associated with the updated retransmission count satisfying a threshold, for conflicts between data communication intervals for the first EMLSR link and beacon reception intervals for a second EMLSR link with the non-AP MLD.

In some examples, the communications manager 1020 may be configured as or otherwise support a means for delaying an MU-RTS transmission associated with an existence, subsequent to initiation of the conflict mitigation procedure, of a conflict between a data communication interval for the first EMLSR link and a beacon reception interval for the second EMLSR link. In some examples, the communications manager 1020 may be configured as or otherwise support a means for delaying the MU-RTS transmission until after a completion of the beacon reception interval for the second EMLSR link. In some examples, the communications manager 1020 may be configured as or otherwise support a means for resetting the retransmission count in association with the delaying of the MU-RTS transmission.

In some examples, the communications manager 1020 may be configured as or otherwise support a means for initiating the conflict mitigation procedure in accordance with the retransmission count satisfying the threshold value and the non-AP MLD being in an active mode on the first EMLSR link and on the second EMLSR link. In some examples, the communications manager 1020 may be configured as or otherwise support a means for refraining from multicast data transmissions on the second EMLSR link during unicast data transmissions on the first EMLSR link.

As used herein, the term "determine" or "determining" encompasses a wide variety of actions and, therefore, "determining" may include calculating, computing, processing, deriving, estimating, investigating, looking up (such as via looking up in a table, a database, or another data structure), inferring, ascertaining, or measuring, among other possibilities. Also, "determining" may include receiving (such as receiving information), accessing (such as accessing data stored in memory) or transmitting (such as transmitting information), among other possibilities. Additionally, "determining" may include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on." "associated with." "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also may be implemented in combination in a single implementation. Conversely, various features that are described in the context of a single implementation also may be implemented in multiple examples separately or in any suitable subcombination. As such, although features may be described above as acting in particular combinations, and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted may be incorporated in the example processes that are schematically illustrated. For example, one or more additional operations may be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems may generally be integrated together in a single software product or packaged into multiple software products.

Implementation examples are described in the following numbered clauses:

1. A non-access point (non-AP) multi-link device (MLD), including: a processing system that includes processor circuitry and memory circuitry that stores code, the processing system configured to cause the non-AP MLD to: update a beacon drop count for a first enhanced multi-link single-radio (EMLSR) link with an access point (AP) MLD in association with there being a conflict between a beacon reception interval for the first EMLSR link and a data communication interval for a second EMLSR link with the AP MLD; and transmit a packet to the AP MLD in association with initiating a communication pause for the second EMLSR link in accordance with the updated beacon drop count satisfying a threshold.
2. The non-AP MLD of clause 1, where the packet includes a request-to-send (RTS) frame or a clear-to-send (CTS)-to-self frame.
3. The non-AP MLD of clause 1 or clause 2, where the packet includes a frame including a network allocation vector (NAV) indicating a duration of the communication pause.
4. The non-AP MLD of clause 3, where the processing system is further configured to cause the non-AP MLD to set the NAV in accordance with a multi-user request-to-send (MU-RTS) reception interval duration, a clear-to-send (CTS) transmission interval duration, a physical layer protocol data unit (PPDU) reception interval duration, or a beacon reception interval duration.
5. The non-AP MLD of any one of clauses 1-4, where the packet includes a quality-of-service (QoS) null frame.
6. The non-AP MLD of clause 5, where the QoS null frame includes a power management (PM) subfield indicating that the non-AP MLD is to operate in a power saving (PS) mode.
7. The non-AP MLD of any one of clauses 1-6, where the processing system is further configured to cause the non-AP MLD to reset the beacon drop count in association with the transmission of the packet to the AP MLD.
8. The non-AP MLD of clause 7, where the processing system is further configured to cause the non-AP MLD to: update the beacon drop count again in accordance with a conflict, subsequent to the reset of the beacon drop count, between a second beacon reception interval for the first EMLSR link and a second data communication interval for the second EMLSR link; and refrain from initiating a second communication pause for the second EMLSR link in accordance with the again-updated beacon drop count not satisfying the threshold.
9. The non-AP MLD of any one of clauses 1-8, where the processing system is further configured to cause the non-AP MLD to: receive, from the AP MLD via the second EMLSR link, during a data communication exchange on the second EMLSR link, a second packet that includes a first multi-user request-to-send (MU-RTS) frame; and drop a second MU-RTS frame transmitted on the first EMLSR link by the AP MLD during the data communication exchange on the second EMLSR link.
10. A method for wireless communication by a non-access point (non-AP) multi-link device (MLD), including: updating a beacon drop count for a first enhanced multi-link single-radio (EMLSR) link with an access point (AP) MLD in association with there being a conflict between a beacon reception interval for the first EMLSR link and a data communication interval for a second EMLSR link with the AP MLD; and transmitting a packet to the AP MLD in association with initiating a communication pause for the second EMLSR link in accordance with the updated beacon drop count satisfying a threshold.
11. The method of clause 10, where the packet includes a request-to-send (RTS) frame or a clear-to-send (CTS)-to-self frame.
12. The method of clause 10 or clause 11, where the packet includes a frame including a network allocation vector (NAV) indicating a duration of the communication pause.
13. The method of clause 12, further including setting the NAV in accordance with a multi-user request-to-send (MU-RTS) reception interval duration, a clear-to-send (CTS) transmission interval duration, a physical layer protocol data unit (PPDU) reception interval duration, or a beacon reception interval duration.
14. The method of any one of clauses 10-13, where the packet includes a quality-of-service (QoS) null frame.
15. The method of clause 14, where the QoS null frame includes a power management (PM) subfield indicating that the non-AP MLD is to operate in a power saving (PS) mode.

16. The method of any one of clauses 10-15, further including resetting the beacon drop count in association with the transmission of the packet to the AP MLD.

17. The method of clause 16, further including: updating the beacon drop count again in accordance with a conflict, subsequent to the reset of the beacon drop count, between a second beacon reception interval for the first EMLSR link and a second data communication interval for the second EMLSR link; and refraining from initiating a second communication pause for the second EMLSR link in accordance with the again-updated beacon drop count not satisfying the threshold.

18. The method of any one of clauses 10-17, further including: receiving, from the AP MLD via the second EMLSR link, during a data communication exchange on the second EMLSR link, a second packet that includes a first multi-user request-to-send (MU-RTS) frame; and dropping a second MU-RTS frame transmitted on the first EMLSR link by the AP MLD during the data communication exchange on the second EMLSR link.

19. An access point (AP) multi-link device (MLD), including: a processing system that includes processor circuitry and memory circuitry that stores code, the processing system configured to cause the AP MLD to: update a retransmission count for a first enhanced multi-link single-radio (EMLSR) link with a non-AP MLD in association with a retransmission of a multi-user request-to-send (MU-RTS) frame of a data communication exchange with the non-AP MLD over the first EMLSR link or a retransmission of a physical layer protocol data unit (PPDU) of the data communication exchange with the non-AP MLD over the first EMLSR link; and monitor, in accordance with a conflict mitigation procedure associated with the updated retransmission count satisfying a threshold, for conflicts between data communication intervals for the first EMLSR link and beacon reception intervals for a second EMLSR link with the non-AP MLD.

20. The AP MLD of clause 19, where the processing system is further configured to cause the AP MLD to delay an MU-RTS transmission associated with an existence, subsequent to initiation of the conflict mitigation procedure, of a conflict between a data communication interval for the first EMLSR link and a beacon reception interval for the second EMLSR link.

21. The AP MLD of clause 20, where the processing system is further configured to cause the AP MLD to delay the MU-RTS transmission until after a completion of the beacon reception interval for the second EMLSR link.

22. The AP MLD of clause 20 or clause 21, where the processing system is further configured to cause the AP MLD to reset the retransmission count in association with the delaying of the MU-RTS transmission.

23. The AP MLD of any one of clauses 19-22, where the processing system is further configured to cause the AP MLD to initiate the conflict mitigation procedure in accordance with the retransmission count satisfying the threshold value and the non-AP MLD being in an active mode on the first EMLSR link and on the second EMLSR link.

24. The AP MLD of any one of clauses 19-23, where the processing system is further configured to refrain from multicast data transmissions on the second EMLSR link during unicast data transmissions on the first EMLSR link.

25. A method for wireless communication by an access point (AP) multi-link device (MLD), including: updating a retransmission count for a first enhanced multi-link single-radio (EMLSR) link with a non-AP MLD in association with a retransmission of a multi-user request-to-send (MU-RTS) frame of a data communication exchange with the non-AP MLD over the first EMLSR link or a retransmission of a physical layer protocol data unit (PPDU) of the data communication exchange with the non-AP MLD over the first EMLSR link; and monitoring, in accordance with a conflict mitigation procedure associated with the updated retransmission count satisfying a threshold, for conflicts between data communication intervals for the first EMLSR link and beacon reception intervals for a second EMLSR link with the non-AP MLD.

26. The method of clause 25, further including delaying an MU-RTS transmission associated with an existence, subsequent to initiation of the conflict mitigation procedure, of a conflict between a data communication interval for the first EMLSR link and a beacon reception interval for the second EMLSR link.

27. The method of clause 26, further including delaying the MU-RTS transmission until after a completion of the beacon reception interval for the second EMLSR link.

28. The method of clause 26 or clause 27, further including resetting the retransmission count in association with the delaying of the MU-RTS transmission.

29. The method of any one of clauses 25-28, further including initiating the conflict mitigation procedure in accordance with the retransmission count satisfying the threshold value and the non-AP MLD being in an active mode on the first EMLSR link and on the second EMLSR link.

30. The method of any one of clauses 25-29, further including refraining from multicast data transmissions on the second EMLSR link during unicast data transmissions on the first EMLSR link.

What is claimed is:

1. A non-access point (non-AP) multi-link device (MLD), comprising:

a processing system that includes processor circuitry and memory circuitry that stores code, the processing system configured to cause the non-AP MLD to:

update a beacon drop count for a first enhanced multi-link single-radio (EMLSR) link with an access point (AP) MLD in association with there being a conflict between a beacon reception interval for the first EMLSR link and a data communication interval for a second EMLSR link with the AP MLD; and transmit a packet to the AP MLD in association with initiating a communication pause for the second EMLSR link in accordance with the updated beacon drop count satisfying a threshold.

2. The non-AP MLD of claim 1, wherein the packet comprises a request-to-send (RTS) frame or a clear-to-send (CTS)-to-self frame.

3. The non-AP MLD of claim 1, wherein the packet comprises a frame including a network allocation vector (NAV) indicating a duration of the communication pause.

4. The non-AP MLD of claim 3, wherein the processing system is further configured to cause the non-AP MLD to set the NAV in accordance with a multi-user request-to-send (MU-RTS) reception interval duration, a clear-to-send (CTS) transmission interval duration, a physical layer protocol data unit (PPDU) reception interval duration, or a beacon reception interval duration.

5. The non-AP MLD of claim 1, wherein the packet comprises a quality-of-service (QoS) null frame.

6. The non-AP MLD of claim 5, wherein the QoS null frame includes a power management (PM) subfield indicating that the non-AP MLD is to operate in a power saving (PS) mode.

7. The non-AP MLD of claim 1, wherein the processing system is further configured to cause the non-AP MLD to reset the beacon drop count in association with the transmission of the packet to the AP MLD.

8. The non-AP MLD of claim 7, wherein the processing system is further configured to cause the non-AP MLD to:

update the beacon drop count again in accordance with a conflict, subsequent to the reset of the beacon drop count, between a second beacon reception interval for the first EMLSR link and a second data communication interval for the second EMLSR link; and refrain from initiating a second communication pause for the second EMLSR link in accordance with the again-updated beacon drop count not satisfying the threshold.

9. The non-AP MLD of claim 1, wherein the processing system is further configured to cause the non-AP MLD to:

receive, from the AP MLD via the second EMLSR link, during a data communication exchange on the second EMLSR link, a second packet that includes a first multi-user request-to-send (MU-RTS) frame; and drop a second MU-RTS frame transmitted on the first EMLSR link by the AP MLD during the data communication exchange on the second EMLSR link.

10. A method for wireless communication by a non-access point (non-AP) multi-link device (MLD), comprising:

updating a beacon drop count for a first enhanced multi-link single-radio (EMLSR) link with an access point (AP) MLD in association with there being a conflict between a beacon reception interval for the first EMLSR link and a data communication interval for a second EMLSR link with the AP MLD; and transmitting a packet to the AP MLD in association with initiating a communication pause for the second EMLSR link in accordance with the updated beacon drop count satisfying a threshold.

11. The method of claim 10, wherein the packet comprises a request-to-send (RTS) frame or a clear-to-send (CTS)-to-self frame.

12. The method of claim 10, wherein the packet comprises a frame including a network allocation vector (NAV) indicating a duration of the communication pause.

13. The method of claim 12, further comprising setting the NAV in accordance with a multi-user request-to-send (MU-RTS) reception interval duration, a clear-to-send (CTS) transmission interval duration, a physical layer protocol data unit (PPDU) reception interval duration, or a beacon reception interval duration.

14. The method of claim 10, wherein the packet comprises a quality-of-service (QoS) null frame.

15. The method of claim 14, wherein the QoS null frame includes a power management (PM) subfield indicating that the non-AP MLD is to operate in a power saving (PS) mode.

16. The method of claim 10, further comprising resetting the beacon drop count in association with the transmission of the packet to the AP MLD.

17. The method of claim 16, further comprising:

updating the beacon drop count again in accordance with a conflict, subsequent to the reset of the beacon drop count, between a second beacon reception interval for the first EMLSR link and a second data communication interval for the second EMLSR link; and refraining from initiating a second communication pause for the second EMLSR link in accordance with the again-updated beacon drop count not satisfying the threshold.

18. The method of claim 10, further comprising:

receiving, from the AP MLD via the second EMLSR link, during a data communication exchange on the second EMLSR link, a second packet that includes a first multi-user request-to-send (MU-RTS) frame; and dropping a second MU-RTS frame transmitted on the first EMLSR link by the AP MLD during the data communication exchange on the second EMLSR link.

* * * * *